(12) United States Patent
Ikeda et al.

(10) Patent No.: US 6,267,095 B1
(45) Date of Patent: Jul. 31, 2001

(54) INTERNAL COMBUSTION ENGINE CONTROL APPARATUS AND CONTROL METHOD

(75) Inventors: Munetoyo Ikeda; Tomohiko Takahashi; Ichirou Fujimori, all of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/415,214

(22) Filed: Oct. 12, 1999

(30) Foreign Application Priority Data

Oct. 19, 1998 (JP) .................................................. 10-296879

(51) Int. Cl.[7] ...................................................... F02B 17/00
(52) U.S. Cl. ........................................... 123/295; 123/305
(58) Field of Search ....................................... 123/295, 305

(56) References Cited

U.S. PATENT DOCUMENTS

| 6,024,069 | * | 2/2000 | Yoshino | 123/295 |
| 6,041,757 | * | 3/2000 | Kadota | 123/295 |
| 6,058,906 | * | 5/2000 | Yoshido | 123/305 |

FOREIGN PATENT DOCUMENTS 10-331696    12/1998   (JP) .

* cited by examiner

*Primary Examiner*—John Kwon
(74) *Attorney, Agent, or Firm*—Foley & Lardner

(57) ABSTRACT

A disclosed control apparatus and method is applied to an internal combustion engine that is capable of switching between a stratified combustion and a homogeneous combustion, and which also has an EGR device prevented from performing EGR immediately after switching from the stratified combustion to the homogeneous combustion. In the disclosure, the transient condition in switching from the stratified combustion to the homogeneous combustion is detected, a residual EGR ratio of EGR gas remaining in an intake system of the internal combustion engine is calculated when the transient condition is detected, a lower limit value of a target equivalent ratio immediately after switching from the stratified combustion to the homogeneous combustion is variably set, in accordance with the residual EGR ratio, and the value of the target equivalent ratio immediately after switching from the stratified combustion to the homogeneous combustion is set to the set lower limit value.

9 Claims, 5 Drawing Sheets

INTERNAL COMBUSTION ENGINE CONTROL APPARATUS AND CONTROL METHOD

BACKGROUND OF THE INVENTION

The invention relates to an internal combustion engine control apparatus and control method, and more particularly to the control of the equivalent ratio when switching is done between stratified combustion and homogeneous combustion in an internal combustion engine capable of switching between these combustion modes in accordance with the driving condition.

In the Japanese laid-open patent application publication 10-331696, there is disclosure of the setting of the lower limit value of the equivalent ratio, in accordance with driving conditions, such as the engine speed, the load and the EGR ratio, immediately before switching from the stratified combustion to the homogeneous combustion.

SUMMARY OF THE INVENTION

According to an investigation by the inventors, in a spark-ignited internal combustion engine, such as one in which fuel is directly injected into a combustion chamber, in the low and medium load regions, fuel is injected during the compression stroke, with a stratified combustible gas mixture being produced in only the region of the spark plug, leading to the possibility of an extremely lean air-to-fuel ratio, which is an advantage with regard to fuel consumption and cleanliness of emissions.

In the above-noted internal combustion engine, because there is an intrinsic limitation in the cylinder volume, in a high-load region, in which there is a demand for a large engine torque, rather than perform the stratified combustion, it is preferable to form a gas mixture having a homogeneous mixture, by injecting fuel during the intake stroke, so that the homogeneous combustion is done. It is therefore preferable that the engine be switchable between the stratified combustion and the homogeneous combustion in accordance with driving conditions.

While it is also preferable that exhaust gas recirculation (EGR) be done for the purpose of reducing $NO_x$ in the exhaust emissions resulting from the stratified combustion, with the homogeneous combustion because it is possible to make the air-to-fuel ratio extremely lean, EGR is not essential and in fact, when EGR is done there is a worsening of combustion, making it preferable that EGR be prohibited.

In an internal combustion engine configured so that the above-noted switching is done between the stratified combustion and the homogeneous combustion, if we consider the case of switching from the stratified combustion to the homogeneous combustion, it is preferable that EGR be stopped at the time of the switching. However, even if EGR itself is stopped, because exhaust gas remains in the exhaust system, this residual exhaust gas causes a tendency to unstable combustion or miss fire of combustion.

On the other hand, if we consider the switch from the homogeneous combustion to the stratified combustion, while it is preferable at the time of this switching to start EGR, because exhaust gas is not instantaneously supplied to the combustion chamber, there is a time delay in the amount of EGR. However, this time lag in the amount of EGR is cancelled out by a time delay in the amount of intake, so there is no particular influence.

In view of the above, it is preferable that, when a switch is made from the stratified combustion to the homogeneous combustion, the lower limit value of the target equivalent ratio be set, in accordance with driving conditions, such as the engine speed, the load, and the EGR ratio immediately before the switching of combustion modes. The above-noted equivalent ratio is a value that is proportional to the reciprocal of the air-to-fuel ratio.

In the above-noted case of setting the equivalent ratio lower limit value, however, if this is taken as simply a fixed value, a torque that is larger than the demanded torque can be generated, the engine speed can increase and there can be an increase in the amount of $NO_x$ emitted in the exhaust.

In accordance with the current investigation of the inventors, the above-noted phenomenon is thought of as occurring because, whereas after switching from the stratified combustion to the homogeneous combustion, there is a reduction in the residual exhaust gas, because the equivalent ratio is limited by the lower limit value, gas that is richer than an appropriate value is combusted.

The present invention was made in consideration of the above-noted phenomenon, and has as an object the provision of an internal combustion engine control apparatus, which, by setting the target equivalent ratio lower limit value so that the equivalent ratio is an appropriate value after a switch from the stratified combustion to the homogeneous combustion, thereby eliminating combustion instability, such as miss fire of combustion, this control apparatus further enabling the prevention of the blow-up of the engine speed caused by an increase in torque, and the reduction of the amount of $NO_x$ exhaust emissions. It is a further object of the present invention to provide a method for performing the above-noted control of an internal combustion engine.

In order to achieve the above-noted object, a control apparatus and control method for an internal combustion engine according to the present invention is applied to an internal combustion engine that enables switching of the combustion mode between the stratified combustion and the homogeneous combustion, that is provided with an EGR apparatus, and that prohibits EGR in the EGR apparatus immediately after switching from the stratified combustion to the homogeneous combustion.

More specifically, a control apparatus for an internal combustion engine according to the present invention comprises: transient condition detection section detecting a transient condition in switching the combustion mode from the stratified combustion to the homogeneous combustion; a residual EGR ratio calculation section calculating, when the transient condition is detected, a residual EGR ratio of EGR gas remaining in an intake system of the internal combustion engine; a lower limit value setting section variably setting a lower limit value of a target equivalent ratio immediately after switching the combustion mode from the stratified combustion to the homogeneous combustion, in accordance with the residual EGR ratio; and a limiter limiting the target equivalent ratio to the lower limit value immediately after switching the combustion mode from the stratified combustion to the homogeneous combustion.

Stated in other terms, a control apparatus for an internal combustion engine according to the present invention comprises: means for detecting a transient condition in switching the combustion mode from the stratified combustion to the homogeneous combustion; means for calculating, when the transient condition is detected, a residual EGR ratio of EGR gas remaining in an intake system of the internal combustion engine; means for variably setting a lower limit value of a target equivalent ratio immediately after switching the combustion mode from the stratified combustion to the homogeneous combustion, in accordance with the residual EGR ratio; and means for limiting the target equivalent ratio to the lower limit value immediately after switching the combustion mode from the stratified combustion to the homogeneous combustion.

On the other hand, a method for controlling an internal combustion engine according to the present invention detects a transient condition in switching the combustion mode from the stratified combustion to the homogeneous combustion calculates a residual EGR ratio of EGR gas remaining in an intake system of the internal combustion engine when the transient condition is detected; variably sets, in accordance with the residual EGR ratio, a lower limit value of the target equivalent ratio immediately after switching the combustion mode from the stratified combustion to the homogeneous combustion; and limits the target equivalent ratio to the lower limit value immediately after switching from the stratified combustion to the homogeneous combustion.

BRIEF DESCRIPTION OF THE ACCOMPANYING DRAWINGS

DETAILED DESCRIPTION OF THE PREFERRED EMBODIMENT

A preferred embodiment of the present invention is described in detail below, with reference to relevant accompanying drawings.

Figure 1:
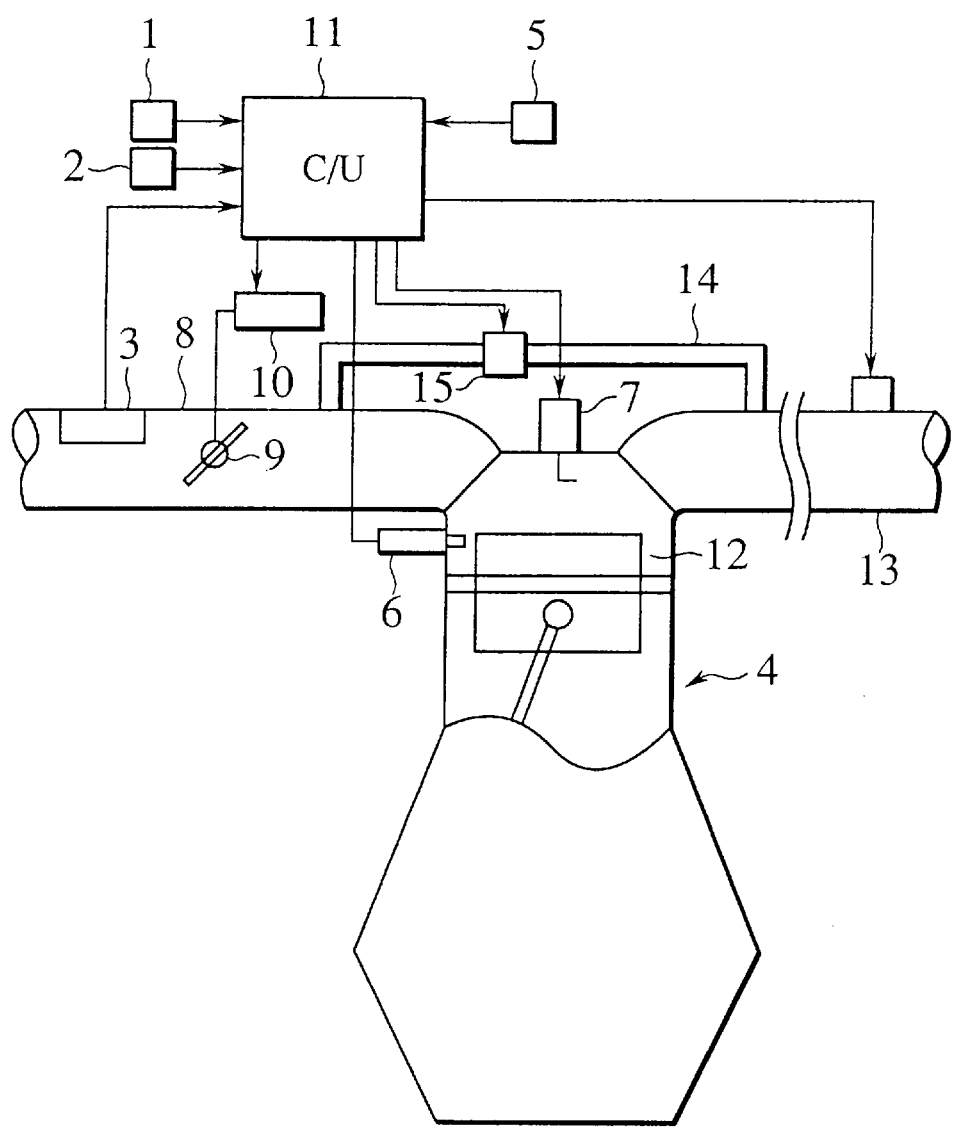
FIG. 1 is a drawing that shows the configuration of a control apparatus for an internal combustion engine according to an embodiment of the present invention.

Referring to FIG. 1, an accelerator actuation amount sensor 1, provided as a means for detecting the amount of accelerator actuation, detects the amount that a driver depresses an accelerator pedal.

A crank angle sensor 2, provided as a means for detecting the engine speed, generates a position signal each unit crank angle and also a reference signal that corresponds to stroke phase difference of each cylinder. By measuring the number of times the position signal is generated each unit time, or the period of the reference signal, the engine speed Ne is detected.

An air flow meter 3 detects the amount of intake air to the engine 4 per unit time.

A water temperature sensor 5 detects the temperature of cooling water of the engine 4.

A cylinder portion of the engine 4 is provided with a fuel injection valve 6, which injects fuel directly into a combustion chamber 12, and a spark plug 7, which performs spark ignition within the combustion chamber 12. In the low-load and medium-load regions, by the injection of fuel into the combustion chamber 12 during the compression stroke, a stratified combustible gas mixture is created in the area surrounding the spark plug 7 in the combustion chamber 12 for performing the stratified combustion, and in the high-load region, by injecting fuel into the combustion chamber 12 during the intake stroke, a gas mixture that is substantially homogeneous is formed throughout the entire cylinder for performing the homogeneous combustion.

A throttle valve 9 is inserted midway in the intake path 8 of the internal combustion engine 4. The opening of this throttle valve 9 is electronically controllable by a throttle valve controller 10.

Detection signals from the above various sensors are input to a control unit 11, which is provided with a microprocessor, a ROM, a RAM, input/output ports or the like. This control unit 11 performs control of the opening of the throttle valve 9 via the throttle valve controller 10, the amount of fuel injection (fuel supply amount) by driving the fuel injection valve 6, and the ignition of the spark plug 7 at the ignition timing set by the control unit 11, in accordance with the driving condition as detected based on the signals from the various sensors.

Additionally, an EGR apparatus is provided, and this is provided with an EGR path 14, which provides a recirculation of a part of the exhaust gas from the exhaust path 13 of the engine 4 into the intake path 8, and an EGR valve 15, which is inserted into the EGR path 14. The EGR is performed in accordance with a control signal from the control unit 11, and this is done when the engine 4 is in the stratified combustion mode. When a switch is made from the stratified combustion to the homogeneous lean combustion mode, this EGR is prohibited, for the reason already described. In the homogeneous combustion using the feedback control with the theoretical air-to-fuel ratio, the EGR control is executed.

The functional block diagram of the control unit 11 is described below, with reference to FIG. 2.

Figure 2:
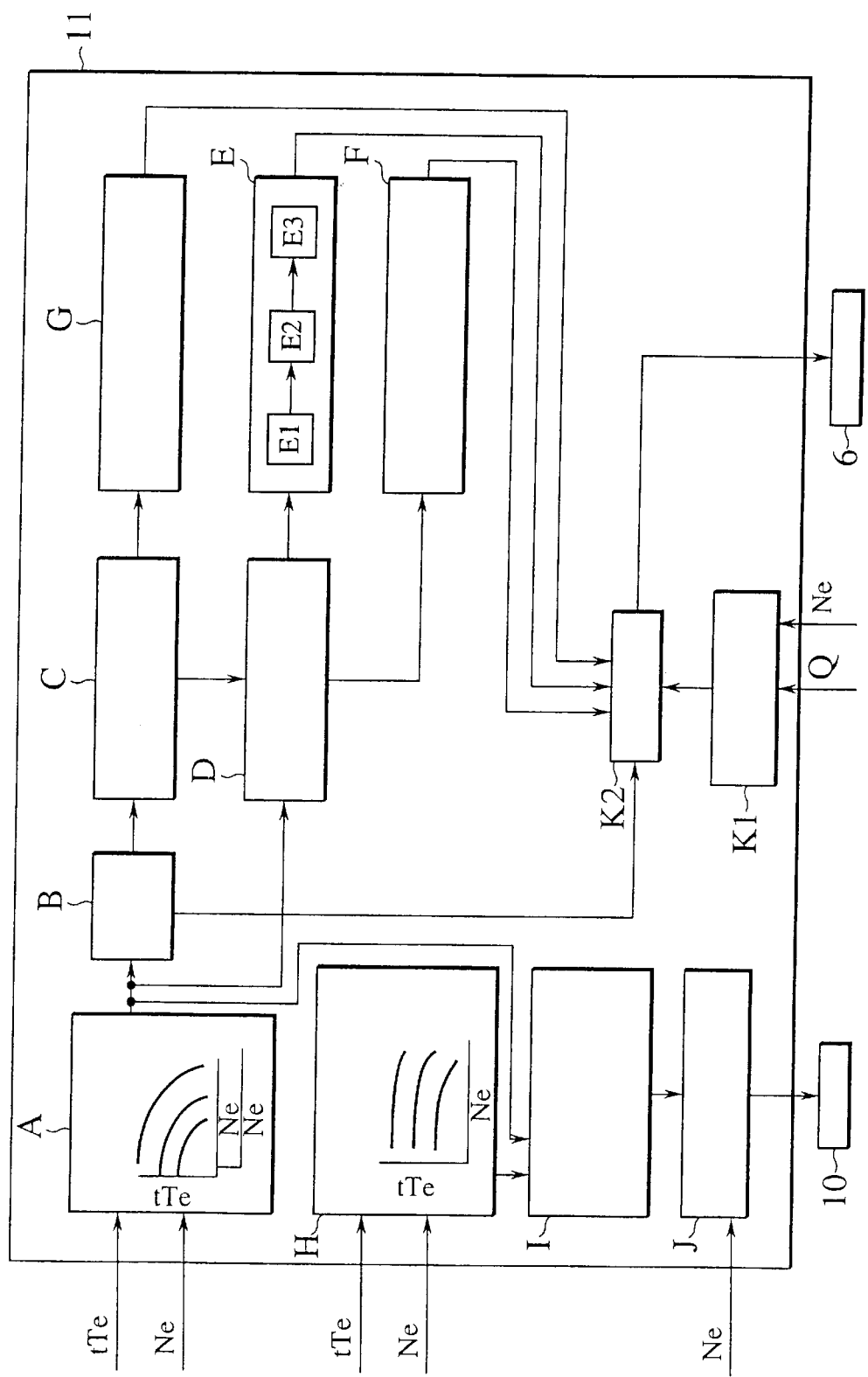
FIG. 2 is a block diagram of the embodiment.

In FIG. 2, a basic target equivalent ratio calculation section A performs a calculation of the basic target equivalent ratio TFBYAB from a map, based on the basic engine operating conditions, such as the engine speed Ne and the target torque tTe. The target torque tTe is set, for example, based on the accelerator actuation amount APS and the engine speed Ne. More precisely, because for a given engine driving condition, whether the engine can be run on a lean air-to-fuel ratio will differ, depending upon such factors as the water temperature, the amount of time after startup, the vehicle speed, the acceleration, and the auxiliary equipment load when idling, and because there could be a switch between the stratified combustion and the homogeneous combustion, a number of target equivalent ratio maps are provided. When a switch is made between the stratified combustion and the homogeneous combustion, in accordance with the driving condition (including the water temperature), the basic target equivalent ratio TFBYAB is stepwise switched, depending upon the differences in combustion efficiency for each combustion condition, as is discussed below.

A phase delay compensator B performs phase delay compensation with respect to the basic target equivalent ratio TFBYAB that is calculated by the basic target equivalent ratio calculation section A. This phase compensation is performed so that, whereas even after the start of control so as to achieve a target intake air amount that is suitable for a change in the basic target equivalent ratio TFBYAB because of a change in the driving conditions or the like, there will be a delay occurring in the change in the operation of the throttle valve, and a delay in the change in the intake air amount in accordance with the volume of the intake system, because it is possible to track the change in the target equivalent ratio with almost no delay in the amount of injected fuel, compensation is performed of the phase delay, in consideration of the phase delay that occurs in the change in the actual equivalent with respect to a change in the target equivalent ratio. Even in the case in which the basic target equivalent ratio is changed in stepwise fashion in response to a switching of the combustion mode, there is phase compensation performed with respect to this stepwise change. More precisely, the processing for this phase delay compensation is performed by using delay compensation coefficients or the like, for giving the operational delay of the throttle valve in response to a change amount in the target equivalent ratio and minimally one step of delay in response to the intake system volume. It is also possible to use a weighted average as the temporary delay compensation, and it is also possible to use only simplified delay compensation with regard to the intake system volume, which has a great influence.

A combustion condition switching detection section C performs a comparison of the phase-compensated target equivalent ratio TFBYAH with a threshold value to make a detection of the actual switching between the stratified combustion and the homogeneous combustion. More specifically, during the stratified combustion if the target equivalent ratio TFBYAH exceeds the threshold value, detection is made of the time for a switch from the stratified combustion to the homogeneous combustion, in response to which the fuel injection timing and ignition timing are changed so as execute a change from the stratified combustion to the homogeneous combustion. In contrast to this, a switch from the homogeneous combustion to the stratified combustion is made when, during the homogeneous combustion, the phase-compensated target equivalent ratio TFBYAH falls below the threshold value. In this case, it is possible to provide threshold values that are different, in accordance with the difference in combustion efficiency between the stratified combustion and the homogeneous combustion.

A homogeneous combustion transient condition detection section D detects a transient condition in the homogeneous combustion immediately after a switch from the stratified combustion to the homogeneous combustion. More specifically, the period of time after the combustion condition detection section C makes a judgment of a switch from the stratified combustion to the homogeneous combustion, and during which the deviation of the phase-compensated target equivalent ratio TFBYAH with respect to the basic target equivalent ratio TFBYA responsive to the homogeneous combustion calculated immediately before the start of phase delay compensation is greater than a prescribed value is detected as the transient condition in the homogeneous combustion.

When the homogeneous combustion transient condition detection section D detects the homogeneous combustion transient condition immediately after a switch from the stratified combustion to the homogeneous combustion, a transient homogeneous combustion equivalent ratio limiter E uses an upper and a lower limit value of the target equivalent ratio set in response to the transient condition to limit the range of values that the phase-compensated target equivalent ratio TFBYAH can take, using a limiter E3. The above-noted upper limit value is set as the same as the upper limit value for steady-state homogeneous combustion, and the lower limit value is set, by the lower limit value setting section E2, to a value that is larger than the lower limit value for the steady-state condition. That is, the basic lower limit value is set in accordance with the engine driving condition (for example, engine speed and load) during the homogeneous combustion after switching, and the residual EGR ratio after target EGR ratio switching in response to a switching of the combustion is calculated by prediction, using the residual EGR ratio calculation section E1, the basic lower limit value being compensated by the residual EGR ratio, so that the lower limit value is set at which it is possible to achieve stable homogeneous combustion, in accordance with the EGR residual gas condition in the intake system.

After the homogeneous combustion transient condition detection section D detects that the homogeneous combustion transient condition has ended and that a transition has been made into the steady state, an equivalent ratio limiter F for steady-state homogeneous combustion limits the range of values that the phase delay compensated target equivalent ratio TFBYAH can take, by the upper and lower limit values of the target equivalent ratio, which are set in accordance with the steady-state condition. The upper and lower limit values pre-established in accordance with engine driving conditions, such as engine speed and load and, as described above, the upper limit is set to the same value as for the steady-state condition, while the lower limit is set to a value that is lower than for the steady-state condition, in order to achieve a smaller target equivalent ratio at which it is possible to have stable combustion.

When the combustion condition detection section D judges the timing of a switch to the stratified combustion and the switch to the stratified combustion is made, a stratified combustion equivalent ratio limiter G, using upper and lower limit values of the target equivalent ratio that are set in accordance with the stratified combustion, limits the values which the phase delay compensated target equivalent ratio TFBYAH can take. The upper and lower limit values that are used as pre-established in accordance with the engine driving condition, such as the engine speed and the load. However, in order to achieve more stable combustion in the transient condition after a switch is made from the homogeneous combustion to the stratified combustion, the upper limit value in the transient condition can be set to a value that is lower than the steady-state upper limit value.

Figure 3:
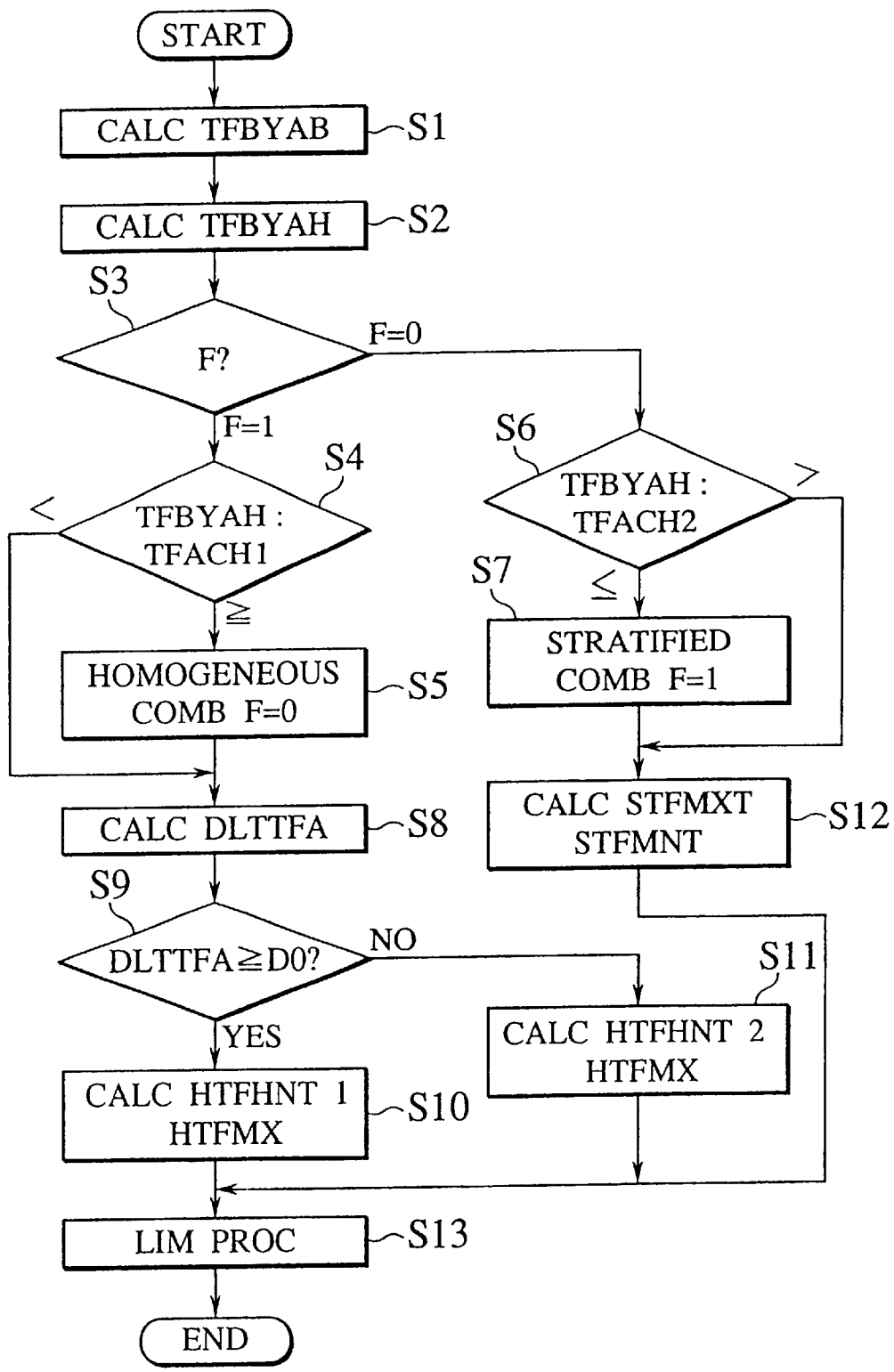
FIG. 3 is a flowchart of the calculations with regard to the target equivalent ratio in the embodiment.

A routine for switching the upper and lower limit values of the target equivalent ratio, in accordance with switching between combustion modes and each steady-state condition is described below, with reference to FIG. 3 and FIG. 4.

At step S1, the basic target equivalent ratio calculation section A determines the basic target equivalent ratio TFBYAB, based on driving conditions such as engine speed and load, using, for example, map lookup.

At step S2, the phase delay compensation section B performs compensation for the phase delay with respect to the basic target equivalent ratio TFBYAB, and calculates the compensated value TFBYAH.

At step S3, the combustion condition switching detection section C makes a judgment of either the stratified combustion or the homogeneous combustion, by means of the value of a flag F. If F=11 for example, a judgment is made that the combustion mode is the stratified combustion, and program control proceeds to step S4, at which the phase delay compensated value of target equivalent ratio TFBYAH is compared with the equivalent ratio threshold value TFACH1.

In the case in which the judgment is that TFBYAH≧TFACH1, program control proceeds to step S5, at which the flag F is reset to 0, and the fuel injection timing and ignition timing are switched, the fuel combustion mode being switched to the homogeneous combustion. However, in the case in which the judgment is that TFBYAH<TFACH1, the stratified combustion is continued. If the homogeneous combustion is detected with F=0, program control proceeds to step S6, at which the phase delay compensated value target equivalent ratio TFBYAH is compared with the equivalent ratio threshold value TFACH2 (<TFACH1) and, if the judgment is made that TFBYAH≧TFACH2, program control proceeds to step S7, at which the flag F is set to 1, and the timing of fuel injection and ignition are switched so as to change the combustion mode to the stratified combustion. If, however, the judgment is made that TFBYAH>TFACH2, the homogeneous combustion is continued. The processing described as steps S3 up until this point is performed by the combustion condition switching detection section C.

When a switch is made from the stratified combustion to the homogeneous combustion, and when the homogeneous combustion is continued, program control proceeds to step S8, at which the homogeneous combustion transient condition detection section D performs a calculation of the deviation DLTTFA (=TFBYAB−TFBYAH) of the target equivalent ratio TFBYA, which was phase delay compensated at step S2, with respect to the basic target equivalent ratio TFBYAB, which was determined at step S1.

Additionally, at step S9 the homogeneous combustion transient condition detection section D makes a judgment as to whether or not the deviation DLTTFA is above a prescribed value D0. If this deviation is above the prescribed value of D0, the judgment is made that the combustion is in the transient condition immediately after switching to the homogeneous combustion, and program control proceeds to step S10. At step S10, the transient homogeneous combustion equivalent ratio limiter E calculates the lower limit value HTFMNT1 and the upper limit value HTFMX of the target equivalent ratio for transient homogeneous combustion. At this point, if the deviation DLTTFA is less than the prescribed value D0, the judgment is made that a transition has been made to steady-state homogeneous combustion, and processing proceeds to step S11. At step S11, the steady-state homogeneous combustion equivalent ratio limiter F looks up from a map the lower limit value HTFMNT2 and the upper limit value HTFMX of the target equivalent ratio for steady-state homogeneous combustion, in accordance with the engine speed and load.

While the upper limit value is set to the same value for the transient and steady-state conditions, with regard to the lower limit value, the lower limit value HTFMNT1 for the transient condition is set to a value that is larger than the lower limit value HTFMNT2 for the steady-state condition. Specifically, this setting is done as described below.

Figure 4:
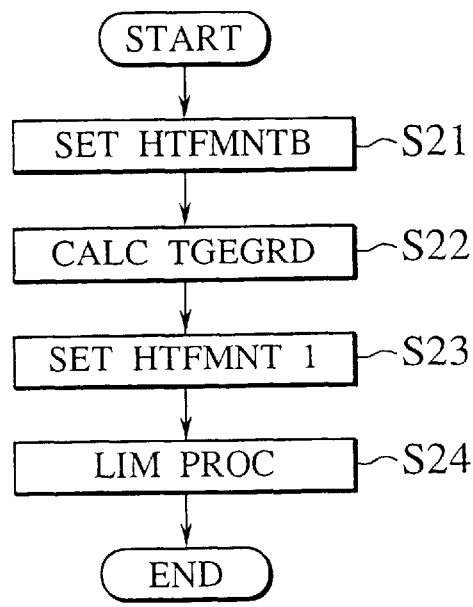
FIG. 4 is a flowchart of the limiting processing of the target equivalent ratio in the embodiment.

FIG. 4 is a flowchart that shows a subroutine for setting the lower limit value HTFMNT1 of the target equivalent ratio for the transient homogeneous combustion condition.

Figure 5:
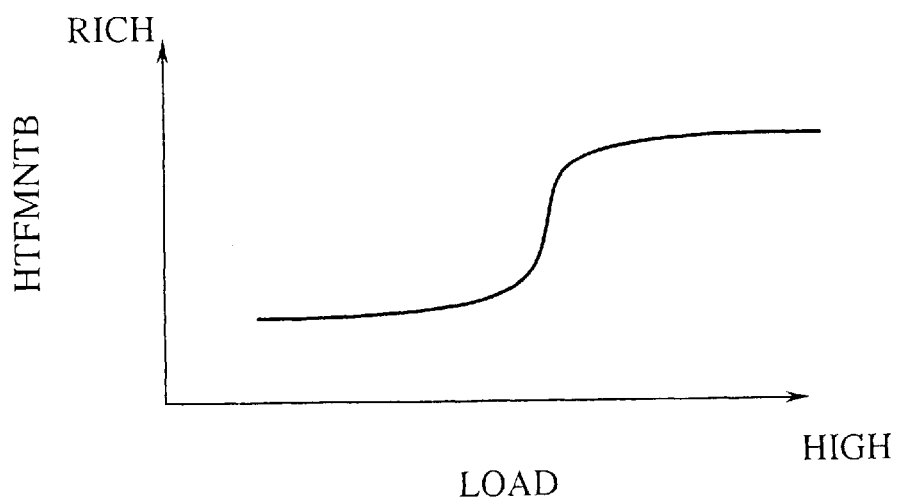
FIG. 5 is a drawing that shows a map of the target equivalent ratio lower limit value in the embodiment.

At step S21 in this subroutine, the basic lower limit value HTFMNTB of the target equivalent ratio is set, based on the engine driving conditions. While these conditions are typically the engine speed and load, because the influence of the engine speed is small, it is possible to set the basic lower limit value HTFMNTB by, for example, lookup from a map, using only load as a parameter. FIG. 5 shows the characteristics of this map, from which the basic lower limit value HTFMNTB of the target equivalent ratio is set in accordance with the load (target combustion pressure torque). While EGR responsive to the normal torque is usually done for the stratified combustion before switching the combustion mode, as will be described below because compensation of the lower limit value with respect to the residual EGR ratio when the combustion mode is switched is performed separately, the setting of the basic lower limit value HTFMNTB is made to a value that takes into consideration the influence of EGR.

At step S22, the residual EGR ratio calculation section E1 of the transient homogeneous combustion equivalent ratio limiter E calculates the residual EGR ratio TGEGRD. The residual EGR ratio TGEGRD is calculated from EGR ratio, taking into account the response delay (wasted time) of the EGR valve, and the time constant of the intake system, using a weighted average.

Figure 6:
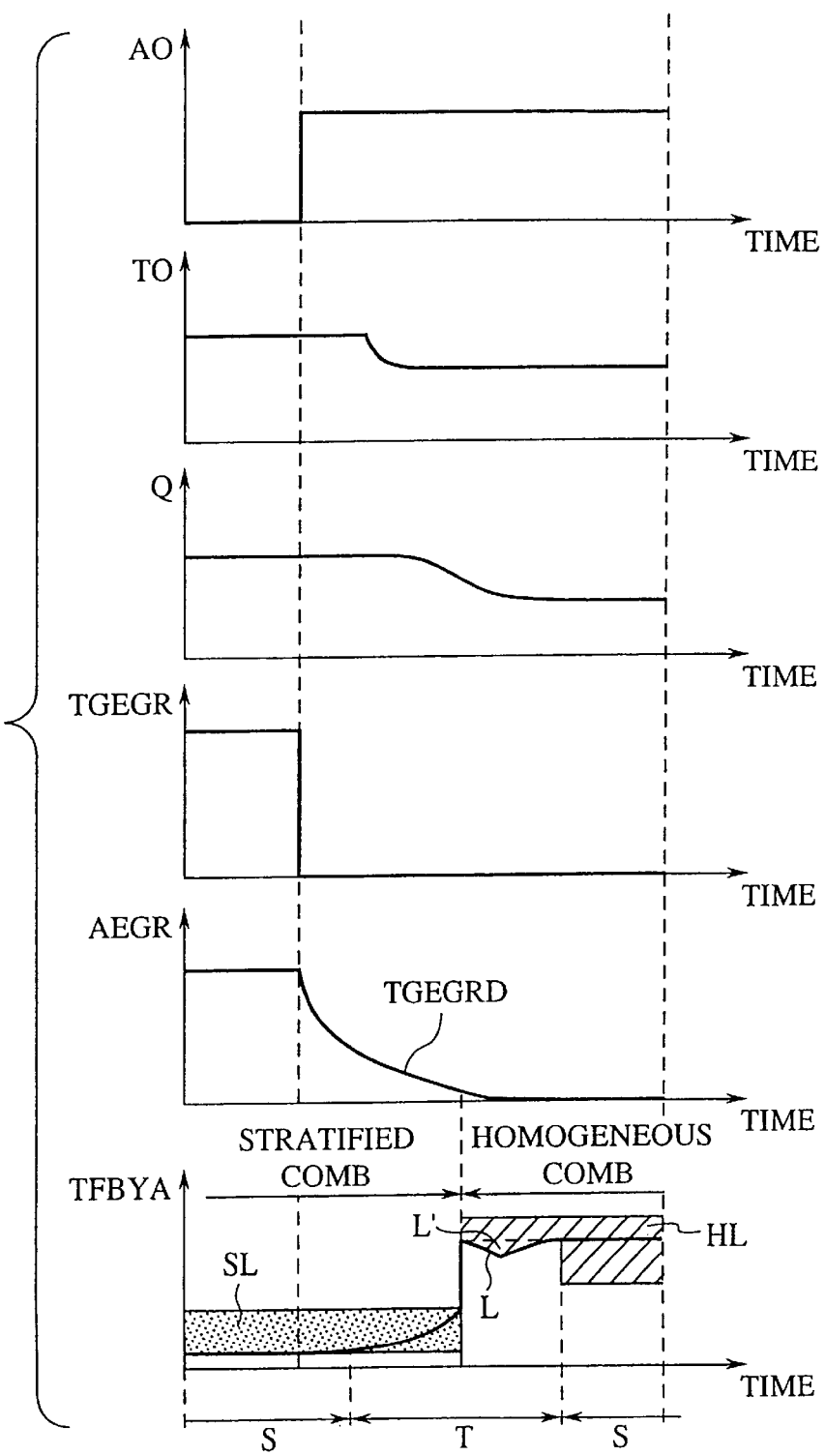
FIG. 6 is a drawing that shows the time variation of the target equivalent ratio in the embodiment.

FIG. 6 shows (from top to bottom) the time variations of the throttle opening TO, the intake air amount Q, the target EGR ratio TGEGR, the actual EGR ratio AEGR, and the target equivalent ratio TFBYA with respect to an accelerator opening AO applied by the driver with the time variations as shown at the top of this drawing. This drawing also shows in time sequence the switching from the stratified combustion to the homogeneous combustion, and the range between the steady-state S and the transient state T of combustion.

As can be seen from the actual EGR ratio AEGR in FIG. 6, this actual EGR ratio produces a residual EGR ratio TGEGRD as shown.

The target EGR ratio TGEGR is switched when the conditions for switching from the stratified combustion to the homogeneous combustion are satisfied, responsive to engine driving conditions, and EGR is prohibited during lean homogeneous combustion, so that the target EGR ratio TGEGR is set to 0. By doing this, the calculation of the residual EGR ratio TGEGRD begins at this point, the calculation being continued during the period in which the transient homogeneous combustion condition is detected by the homogeneous combustion transient condition detection section D. Here, the residual EGR ratio TGEGRD is calculated by the following equation.

$$TGEGRD = TGEGR1 \times FLGAD4 + TGEGRD\,(old) \times (1 - FLGAD4)$$

In the above equation, TGEGRL is the target EGR ratio after compensation for delay time. Specifically, the target EGR ratio TGEGR before the EGR valve delay time (wasted time) is used. TGEGRD (old) is the residual EGR ratio TGEGRD calculated the previous time (for example 10 ms previously), and FLGAD4 is the time constant of the intake system.

Next, at step S23 the basic lower limit value HTFMNTB set at step S21 is compensated, according to the following equation, using the residual EGR ratio TGEGRD that was predicted at step S22, and the lower limit value HTFMNT1 of the target equivalent ratio for lean transient condition homogeneous combustion is set.

$$HTFMNT1 = HTFMNTB \times (TGEGRD \times HTFMNSG - 1)$$

In the above equation, HTFMNSG is the fine adjustment gain that reflects the residual EGR ratio.

At step S24, limit processing for the purpose of preventing calculation error of the like from causing the lower limit value HTFMNT1 calculated as noted above from exceeding a normal limit is performed. That is, in the case in which the calculated lower limit value HTFMNT1 exceeds a prescribed upper limit value, it is fixed at the upper limit value, and if it falls below a prescribed lower limit value, it is fixed at the lower limit value.

The processing at steps S23 and S24 is performed by the lower limit value setting section E2 of the transient homogeneous combustion equivalent ratio limiter E.

The lower limit value HTFMNT1 of the target equivalent ratio for transient homogeneous combustion determined in the above manner is indicated by the line L in the section of FIG. 6 that illustrates the target equivalent ratio TFBYA. It can be seen that, by compensating the residual EGR ratio TGEGRD, there is a change in the lower limit value HTFMNT1 from the line L' to the line L. Additionally, taking into consideration the upper limit value HTFMX of the target equivalent ratio for transient homogeneous combustion, the lower limit value HTFMNT2 of the target EGR ratio for steady-state homogeneous combustion, and the upper limit value thereof HTFMX, the limiter range in steady-state homogeneous combustion is as indicated by the region HL in FIG. 6.

Returning to FIG. 3, when a switch is made from the homogeneous combustion to the stratified combustion, and when the homogeneous combustion is being continued, program control proceeds to step S12, at which the upper limit value STFMXT and the lower limit value STFMNT of the target equivalent ratio for the stratified combustion are calculated by the stratified combustion equivalent ratio limiter section G, in accordance with the engine speed and load, using lookup from a map, for example.

Taking into consideration the upper limit value STFMXT and the lower limit value STFMNT of the target equivalent ratio for the stratified combustion determined in the above-described manner, the limiter range for the stratified combustion condition is the region SL indicated in FIG. 6.

At step S13, limiting processing is performed by making a comparison is made between the phase delay compensated target equivalent ratio TFBYH and the upper and lower limit values of the target equivalent ratio for each condition, and the value is limited to the range defined by the upper and limit values.

In the case in which the homogeneous combustion is in the transient condition, the above-noted limiting processing is performed by the transient homogeneous combustion equivalent ratio limiter E, in the case in which the homogeneous combustion is in the steady state, this processing is performed by the limiter E3 of the homogeneous combustion equivalent ratio limiter F, and in the case of the stratified combustion, this processing is performed by the stratified combustion equivalent ratio limiter G. The target equivalent ratio TFBYA that is limited by this limiting processing is set such as shown by the example indicated by a solid line at the bottom section of FIG. 6. This target equivalent ratio TFBYA is already compensated for phase delay.

Next, the control of the amount of intake air and amount of fuel injection, using the intermediate and final equivalent ratios as determined above is described below, with reference being made to FIG. 2.

The accelerator actuation amount APS and the engine speed Ne, or the target torque tTe that is calculated therefrom and the engine speed Ne are input to the reference target air intake amount calculation section H, which calculates, using a map lookup, for example, the reference target air intake amount tTP, as the value that corresponds to the amount of air intake obtained using the theoretical air-to-fuel ratio as the reference equivalent ratio. As the reference air intake amount tTP, in addition to the reference amount of fuel injection that corresponds to the amount of air that is intaken on each intake stroke, it is possible to use either the amount of air intaken on each intake stroke itself, or the amount to air taken in per unit time, as detected by the air flow meter 3.

A target intake air amount calculation section I calculates the target amount of air intake tTP' that correspond to the basic target equivalent ratio TFBYAB. While it is possible to simply divide the reference target air intake amount by the basic target equivalent ratio TFBYAB, in actuality the combustion efficiency is dependent upon the difference in the basic target equivalent ratio TFBYAB with respect to the reference equivalent ratio, so that there is a difference in the amount of fuel required. Because of this, it is possible, by performing appropriate compensation in accordance with the combustion efficiency beforehand, to determine the target amount of air intake tTP' that satisfies the target torque and target equivalent ratio simultaneously. Specifically, the reference target amount of air intake tTP is divided by the basic target equivalent ratio TFBYAB, and then further divided by the combustion efficiency ITAF that corresponds to the basic target equivalent ratio TFBYAB.

The target air intake amount tTP' and the internal combustion engine speed Ne are input to the target throttle valve opening calculation section J, which calculates the target throttle valve opening tTPS. The target throttle valve opening tTPS is the throttle opening that results in the target air intake amount tTP'.

A target throttle valve opening tTPS signal is input to the throttle valve controller 10, the result being that the throttle valve controller 10 drives the throttle valve 9 so as to achieve the target throttle valve opening tTPS.

The amount of fuel supplied is calculated by the basic fuel supply amount calculation section K1 and the compensation calculation section K2. The air intake amount Q per unit time, which is detected by the air flow meter 3, and the internal combustion engine speed Ne are input to the basic fuel supply amount calculation section K1, which calculates the with TP of a basic fuel injection pulse that corresponds to the amount of air intake per unit time for the case of the theoretical air-to-fuel ratio (reference equivalent ratio).

The compensation calculation section K2 multiplies the basic fuel injection pulse width TP by the already-limited target equivalent ratio TFBYA, so as to calculate the effective fuel injection pulse width TE, an invalid pulse width TS in accordance with the battery voltage being added to this effective fuel injection pulse width TE, so as to obtain the final fuel injection pulse width TI.

A fuel injection pulse having the fuel injection pulse width TI is output to the fuel injection valve 6, which is driven so as to supply an amount of fuel that corresponds to the target air-to-fuel ratio (target equivalent ratio).

According to the embodiment of the present invention as described in detail above, in the transient condition immediately after switching from the stratified combustion to the homogeneous combustion, by calculating the residual EGR ratio with high precision and performing successive compensation of the lower limit value of the target equivalent ratio, so as to limit the influence on the equivalent ratio of residual EGR gas in the intake system that remains in the intake system because of EGR in the stratified combustion, it is possible to set the optimal equivalent ratio at all times. That is, it is possible not only to prevent loss of ignition caused by increasing the setting of the equivalent ratio so suit the residual EGR gas, in accordance with the residual EGR ratio, but also, by reducing the setting of the equivalent ratio in response to the residual EGR ratio, which is reduced with the passage of time, to prevent blow-up of engine speed caused by excessive torque, as well as to prevent an increase in $NO_x$ exhaust emissions caused by an excessively rich fuel mixture.

In the above-noted embodiment, the various maps used were priorly stored in the ROM of the control unit 11.

The entire contents of a Patent Application No. TOKUGANHEI 10-296879, with a filing date of Oct. 19, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. An internal combustion engine control apparatus, the engine being capable of switching a combustion mode between a stratified combustion and a homogeneous combustion, and being provided with an EGR device that is prevented from performing EGR immediately after switching the combustion mode from the stratified combustion to the homogeneous combustion, the apparatus comprising:

transient condition detection section detecting a transient condition in switching the combustion mode from the stratified combustion to the homogeneous combustion;

a residual EGR ratio calculation section calculating, when the transient condition is detected, an actual residual EGR ratio of EGR gas remaining in an intake system of the internal combustion engine;

a lower limit value setting section, variably setting a lower limit value of a target equivalent ratio immediately after switching the combustion mode from the stratified combustion to the homogeneous combustion, the lower limit value calculated as a function of the actual residual EGR ratio; and a limiter limiting the target equivalent ratio to the lower limit value immediately after switching the combustion mode from the stratified combustion to the homogeneous combustion.

2. A control apparatus according to claim 1, wherein the residual EGR ratio calculation section uses an EGR ratio, obtained by taking into consideration a delay in response of an EGR valve in the EGR device, and a time constant of the intake system of the internal combustion engine to calculate the actual residual EGR ratio, using a weighted average calculation.

3. A control apparatus according to claim 1, wherein the target equivalent ratio is compensated in accordance with a delay in a target air intake amount of the internal combustion engine.

4. A control apparatus according to claim 3, wherein the combustion mode is switched from the stratified combustion to the homogeneous combustion when the target equivalent ratio, compensated in accordance with the delay, exceeds a predetermined threshold value.

5. A control apparatus according to claim 3, wherein the transient condition detection section detects that the combustion mode is in the transient condition when the deviation, between the target equivalent ratio not compensated in accordance with the delay and the target equivalent ratio compensated in accordance with the delay, is equal to a predetermined value or more.

6. An internal combustion engine control apparatus, the engine being capable of switching a combustion mode between a stratified combustion and a homogeneous combustion, and being prevented from performing EGR immediately after switching the combustion mode from the stratified combustion to the homogeneous combustion, the apparatus comprising:

means for detecting a transient condition in switching the combustion mode from the stratified combustion to the homogeneous combustion;

means for calculating, when the transient condition is detected, an actual residual EGR ratio of EGR gas remaining in an intake system of the internal combustion engine;

means for variably setting a lower limit value of a target equivalent ratio immediately after switching the combustion mode from the stratified combustion to the homogeneous combustion, the lower limit value calculated as a function of the actual residual EGR ratio; and means for limiting the target equivalent ratio to the lower limit value immediately after switching the combustion mode from the stratified combustion to the homogeneous combustion.

7. A method of controlling an internal combustion engine capable of switching a combustion mode between a stratified combustion and a homogeneous combustion, and prevented from performing EGR immediately after switching the combustion mode from the stratified combustion to the homogeneous combustion, the method comprising:

detecting a transient condition in switching the combustion mode from the stratified combustion to the homogeneous combustion;

calculating an actual residual EGR ratio of EGR gas remaining in an intake system of the internal combustion engine when the transient condition is detected;

variably setting, in accordance with the residual EGR ratio, a lower limit value of the target equivalent ratio immediately after switching the combustion mode from the stratified combustion to the homogeneous combustion, wherein the lower limit value is calculated as a function of the actual residual EGR ratio; and limiting the target equivalent ratio to the lower limit value immediately after switching from the stratified combustion to the homogeneous combustion.

8. The control apparatus according to claim 1, wherein the actual residual EGR ratio is calculated based on a target EGR ratio and a delay in response of the EGR device.

9. The control apparatus according to claim 1, wherein the actual residual EGR ratio is calculated based on a target EGR ratio and a time constant of the intake system.

* * * * *